United States Patent [19]

Rowsey

[11] Patent Number: 4,629,225
[45] Date of Patent: Dec. 16, 1986

[54] PIPE JOINT FOR CORROSION RESISTANT ALLOYS

[75] Inventor: James H. Rowsey, Huntington, W. Va.

[73] Assignee: Inco Alloys International, Inc., Huntington, W. Va.

[21] Appl. No.: 764,095

[22] Filed: Aug. 9, 1985

[51] Int. Cl.$^4$ ............................................. F16L 25/00
[52] U.S. Cl. .................. 285/334.1; 285/334; 285/333
[58] Field of Search ............ 285/332, 333, 334, 334.1, 285/334.2

[56] References Cited

U.S. PATENT DOCUMENTS

| 1,590,357 | 6/1926 | Feisthamel | 285/332.1 |
| 2,181,343 | 11/1939 | Reimschissel | 285/14 C |
| 2,915,322 | 12/1959 | Dunlop | 285/10 |
| 3,100,656 | 8/1963 | MacArthur | 285/333 |
| 4,002,359 | 1/1977 | Lari | 285/333 |
| 4,174,124 | 11/1979 | Dockree | 285/54 |
| 4,426,105 | 1/1984 | Plaquin et al. | 285/92 |

OTHER PUBLICATIONS

"VAM Joints Design and Applications", by J. L. Duret, Vallourec, Mar., 1978.

Primary Examiner—Richard J. Scanlan, Jr.
Assistant Examiner—Douglas W. Hanson
Attorney, Agent, or Firm—Edward A. Steen; Raymond J. Kenny

[57] ABSTRACT

A pipe joint especially suited for coupling two high strength, corrosion resistant pipes. The box end is expanded by a cold working operation thereby eliminating metallurgical problems and changes associated with hot working operations. A sleeve is nested into the internal transition section of the box end to form a sealing surface between the two pipes. Moreover, the sleeve presents a smooth uninterrupted, internal flow surface.

4 Claims, 1 Drawing Figure

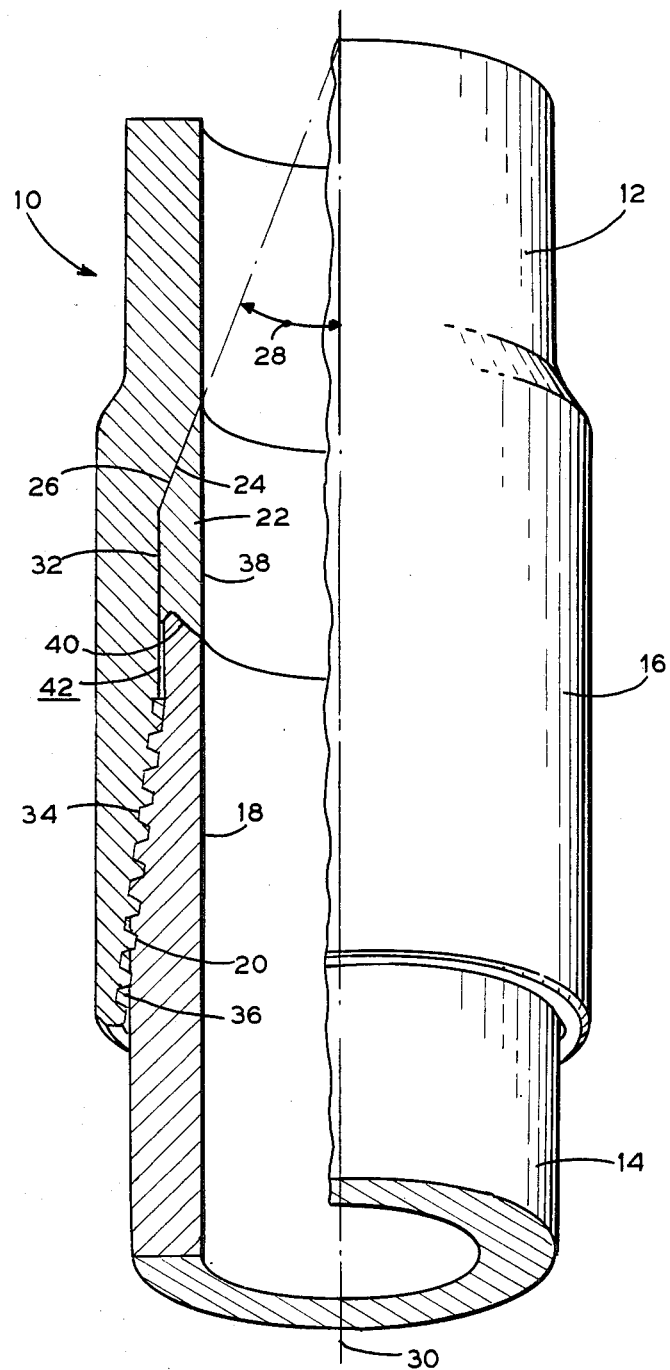

PIPE JOINT FOR CORROSION RESISTANT ALLOYS

TECHNICAL FIELD

The instant invention relates to pipe joints in general and, more particularly, to a joint especially suited for pipes fabricated from corrosion resistant alloys.

BACKGROUND ART

Presently, joints connecting two ends of pipe, especially in oil fields, are usually comprised of two male threaded members registered with a threaded intermediate female coupling member.

An alternative to the use of a separate coupling member is an integral pipe joint. One end of a threaded pipe (the box end) is expanded so that it may be screwed over a threaded end (the pin end) of a second pipe. The pin end is usually a threaded frustum.

The union must be leak resistant and capable of withstanding very debilitating environments for long periods of time with little or no maintenance. Moreover, oil pipes may extend four to five miles (6.4–8 km) into the earth which, due to the tremendous hanging weight of such a configuration, places extremely high tension loads on the pipe and and couplings.

Under these hellish circumstances, (high tension loadings, corrosive conditions, high temperatures, etc.), corrosion resistant, high strength alloys are extensively utilized to extend the service life of the tubing and associated hardware. Nickel-base alloys, such as INCOLOY alloy 825 (INCOLOY is trademark of the Inco family of companies), are frequently specified for service under these conditions.

The current practice of forming an integral pipe joint for standard (i.e., non-high alloy) pipes is to hot upset one end of the pipe. The major drawback to this method is that the superior metallurgical characteristics of the alloy (high strength, corrosion resistant, etc.) tend to be detrimentally altered as a result of the hot working operations. Since the alloy is initially developed and selected for service under the above-mentioned severe conditions, it makes little sense to alter or perhaps destroy the very characteristics that make the alloy so desirable in the first place. In addition, hot upsetting a high alloy pipe may cause it to break. Accordingly, this practice is usually limited to steel and iron pipe.

Representative references demonstrating the joint art include U.S. Pat. Nos. 1,590,357, 2,181,343, 2,915,322, 4,174,124 and 4,426,105.

SUMMARY OF THE INVENTION

Accordingly, there is provided a pipe that does not substantially degrade the metallurgical characteristics of alloy pipe.

The end of a pipe is cold worked to form a box end of a pipe joint to permit the machining of threads and shoulders while simultaneously ensuring adequate strength and sealing properties required for petroleum applications and sour and corrosive medium applications. An internal sleeve is bonded to the interior of the box end for registration against the pin end.

The instant invention reduces the amount of thread and seal machining by one half and completely eliminates the use of separate coupling stock.

BRIEF DESCRIPTION OF THE DRAWING

The FIGURE is a cross sectional view, partially broken away, of an embodiment of the invention.

PREFERRED MODE FOR CARRYING OUT THE INVENTION

Referring to the Figure, there is shown a pipe joint 10. The joint 10 includes pipe 12 and pipe 14. Although the pipes 12 and 14 may be made from any material, and indeed the invention is suitable for any union, it is preferred to utilize corrosion resistant, high strength alloy materials.

The end portion of the pipe 12 is expanded to form box end 16. The end portion of the pipe 14 is machined to form pin end 18. Both the box end 16 and the pin end 18 include corresponding threads 20. Since an oil tube string becomes so heavy it is preferred to utilize square fit or buttress type threads 20.

A sleeve 22, preferably comprised of the same material as the pipes 12 and 14, is nested in transition section 24 of the box end 16.

The transition section 24 (and the box end 16) is flared outwardly by the use of a mandrel. The mandrel is fored into the pipe 12 so as to cause the formation of the box end 16. Rather than upsetting the alloy pipe 12 by hot working the piece, which may very likely cause it to break, the pipe 12 is flared outwardly by a mandrel of predetermined dimension. The cold working operation imparts additional strength to the joint 10. As discussed before, affirmative hot working is eliminated. Rather, cold formability is desired and used to great advantage.

The stepped transition section 24 includes angled segment 26 formed on a predetermined angle 28 from axis of symmetry 30. The angled segment 26 continues along straightaway 32, which is essentially parallel with the pipe 12 wall, until first threaded section 34. The threaded section 34 angles away from the axis 30 to register with second threaded section 36 of the pipe 14.

The sleeve 22 should be bonded to the transition section 24. The sleeve 22 may be force fitted into the transition section 24 or it may be friction welded into place. To accomplish the latter, the box end 16 is held fixed and the sleeve 22 is registered with a rotating mandrel that is then introduced into the box end 16. Upon contacting the transition section 24 and the angled segment 26, the frictional heat generated between the box end 16 and the rotating sleeve 22 will cause localized welding to occur so as to bond the sleeve 22 to the box end 16.

The internal diameter 38 of the sleeve 22, in the embodiment shown, is selected to match that of the two pipes 12 and 14. It is preferred to present a smooth, flush, continuous internal flow surface throughout most of the pipe string in order to reduce frictional losses therein. Any change in internal pipe diameter can introduce undesirable flow pattern disturbances. Of course, the instant invention may be utilized to join tubes of unequal diameter together as well.

The pin end 18 may be formed with an irregular end surface or edge 40 to assist in forming a leak resistant seal with the sleeve 22. When the pipe 14 is screwed into the pipe 12 the irregular end surface 40 will bite into the sleeve 22. By being buried in the sleeve 22, the edge 40 is not exposed to the fluid flow within the pipes. This permits the formation of the desired flush, smooth internal surface while simultaneously reducing the possibility of fluid leakage, stoppages, contaminant accumulations, and erosion of the joint 10. As a consequence of the abutted relationship between the edge 40 and the sleeve 22, the end of the pipe 14 never sees the flowing medium nor does it distort its flow. Moreover, the nature of the crooked edge 40, when compared to a flat edge, creates a more tortuous fluid flow path so as to reduce the possibility of fluid leakage.

Clearance 42 provides an expansion space to accommodate the various components during formation, threading and under operating conditions.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property of privilege is claimed are defined as follows:

1. A pipe joint union, the union comprising a first pipe made from a high strength, corrosion resistant alloy and having a cold worked expanded box end, the box end of the first pipe threadably engaging a pin end of a second pipe, the first and second pipes having a common axis of symmetry, the box end of the first pipe including an internal transition section of mostly larger internal diameter than the internal diameter of the first pipe, a sleeve disposed within the transition section, the internal diameter of the sleeve substantially equal to the internal diameter of the first and second pipes so as to present an essentially continuous, smooth internal surface therewith, the pin end of the second pipe having a first irregular edge, and the sleeve having a second irregular edge complimentary to the first irregular edge of the pin so as to sealingly mesh with the first irregular edge of the pin.

2. The pipe joint union according to claim 1 wherein the transition section includes an angled segment lying on a predetermined acute angle away from the axis of symmetry, a straightaway ssection extending from the angled segment and essentially parallel with the axis of symmetry, a threaded section thereafter, and a clearance formed between a portion of the straightaway and the pin end in the vicinity of the second irregular edge.

3. The pipe joint union according to claim 1 wherein the pipes are made from nickel-base alloys.

4. The pipe joint union according to claim 1 wherein the first and second pipes are oil well pipes.

* * * * *